J. D. ADNEY.
Coffee Steepers.
No. 139,645.  Patented June 10, 1873.
Fig. I
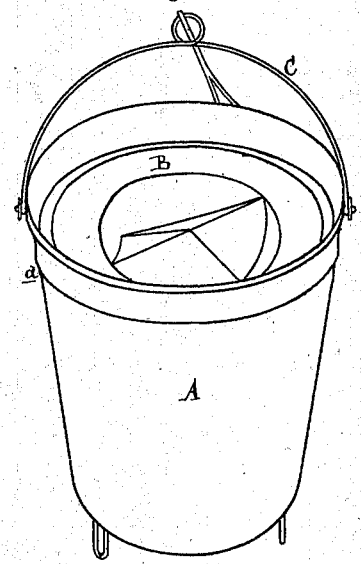
Fig. II
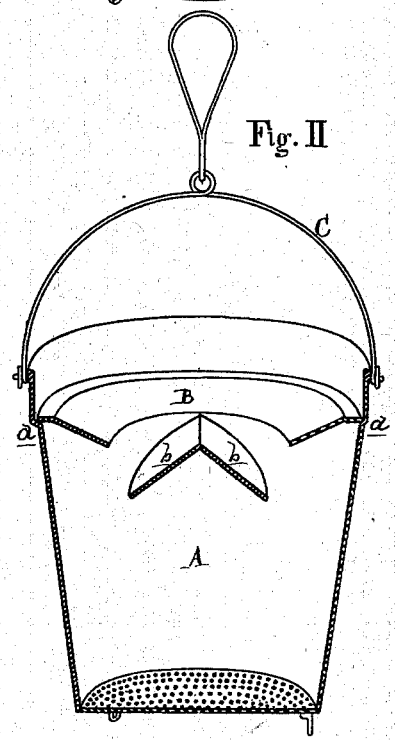
Attest:
H. F. Eberts
T. J. Sprague
Inventor:
Joseph D. Adney
per attorney
Thos. S. Sprague

UNITED STATES PATENT OFFICE.

JOSEPH D. ADNEY, OF CHICAGO, ILLINOIS.

IMPROVEMENT IN COFFEE-STEEPERS.

Specification forming part of Letters Patent No. 139,645, dated June 10, 1873; application filed March 28, 1873.

*To all whom it may concern:*

Be it known that I, JOSEPH D. ADNEY, of Chicago, in the county of Cook and State of Illinois, have invented a new and useful Improvement in Coffee-Steepers; and I do declare that the following is a true and accurate description thereof, reference being had to the accompanying drawings and to the letters of reference marked thereon, and being a part of this specification, in which—

Figure 1 is a perspective view, and Fig. 2 is a vertical longitudinal section.

Like letters refer to like parts in each figure.

The nature of this invention relates to the construction of a device to be used in the steeping of coffee, whereby the entire strength can be extracted from the coffee, and the grounds extracted or separated from the fluid. The invention consists in a cylindrical vessel provided with a perforated bottom, and a diaphragm provided with two downward-projecting wings, for the purposes hereinafter more fully set forth.

In the drawing, A represents a cylindrical vessel, provided with a perforated bottom. Near the top of this vessel is formed an inward-projecting flange or bead, a, upon which rests the inclined diaphragm B, the center of which is punched down in the shape of two pendent demilunes, b. A bail, C, is rigidly secured to the top of the vessel, so that it will always be in an upright position; this bail is provided with a handle, by which the strainer can be lifted from the coffee-pot.

The coffee is first boiled in the usual manner, and after it is sufficiently cooked this device is then set into the center of the coffee-pot; the boiling of the coffee carries the fluid and grounds over the top of the vessel A, where it falls onto the inclined diaphragm, passing down into the vessel, where, as the fluid within the vessel is quiet, the grounds will settle to the bottom, while the fluid will percolate through the grounds and the perforated bottom, thus extracting the entire strength from the coffee-grounds, and separate them from the fluid. By removing the inclined diaphragm from the vessel, the latter may also be used as a tea-strainer. If desired, the vessel may be lifted above the coffee in the boiler, and boiling water poured through the vessel, which will extract any strength there may be remaining in the grounds.

What I claim as my invention, and desire to secure by Letters Patent, is—

The construction and arrangement of the vessel A, provided with a perforated bottom, and an inclined diaphragm, B, provided with the two pendent demilunes b, substantially as and for the purpose set forth.

JOSEPH D. ADNEY.

Witnesses:
WM. H. LOTZ,
EMIL HARKEY.